United States Patent
Huang et al.

(10) Patent No.: US 8,711,991 B2
(45) Date of Patent: Apr. 29, 2014

(54) METHOD AND A CHANNEL ESTIMATING ARRANGEMENT FOR PERFORMING CHANNEL ESTIMATION

(75) Inventors: Jinliang Huang, Solna (SE); Krister Sundberg, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 343 days.

(21) Appl. No.: 13/084,470

(22) Filed: Apr. 11, 2011

(65) Prior Publication Data

US 2011/0274187 A1 Nov. 10, 2011

(30) Foreign Application Priority Data

Apr. 21, 2010 (EP) ..................................... 10160594

(51) Int. Cl.
*H03D 1/00* (2006.01)

(52) U.S. Cl.
USPC ........... 375/343; 375/260; 375/267; 375/143; 375/299; 375/349

(58) Field of Classification Search
USPC ................. 375/343, 260, 267, 143, 299, 349
See application file for complete search history.

(56) References Cited

U.S. PATENT DOCUMENTS

| | | | |
|---|---|---|---|
| 7,453,793 B1 | 11/2008 | Jones, IV et al. | |
| 2007/0286062 A1* | 12/2007 | Gupta | 370/203 |
| 2009/0304062 A1* | 12/2009 | Tseng et al. | 375/232 |
| 2010/0158146 A1* | 6/2010 | Hamaguchi et al. | 375/260 |
| 2010/0172316 A1* | 7/2010 | Hwang et al. | 370/330 |
| 2011/0002403 A1* | 1/2011 | Wilhelmsson et al. | 375/260 |

FOREIGN PATENT DOCUMENTS

| | | |
|---|---|---|
| EP | 1 675 335 A1 | 6/2006 |
| WO | 2007/103183 A2 | 9/2007 |

OTHER PUBLICATIONS

Soderstrom, T. et al. "System Identification", Prentice Hall, Upper Saddle River, New Jersey, USA, 1989.
Extended European Search Report, dated Sep. 23, 2010, in connection with European Patent Application No. 10160594.7-2415.

(Continued)

*Primary Examiner* — Kabir A Timory
(74) *Attorney, Agent, or Firm* — Potomac Patent Group PLLC

(57) ABSTRACT

The invention relates to a method in a receiving communication node for performing channel estimation on a signal received over a channel from a transmitting communication node. The receiving and transmitting communication nodes are comprised in a radio communications network. The receiving communication node receives the signal from the transmitting communication node, filters the signal by applying matched filter to the received signal in a matched filter process resulting in an estimated channel, transforms the estimated channel from a frequency domain to a discrete cosine transform domain in a discrete cosine transformation process, truncates the transformed estimated channel by applying a sloped window truncation function of an adaptive length onto the transformed estimated channel, wherein the adaptive length in the discrete cosine transform domain is calculated based on channel state information, and transforms the truncated transformed estimated channel from the discrete cosine transform domain to the frequency domain in an inverse discrete cosine transformation process resulting in a channel estimate of the channel estimation.

11 Claims, 8 Drawing Sheets

(56) References Cited

OTHER PUBLICATIONS

Raghavendra et al. "Improving channel estimation in OFDM systems for sparse multipath channels" 2004 IEEE 5th Workshop on Signal Processing Advances in Wireless Communications, Lisbon, Portugal, Jul. 11-14, 2004, pp. 106-109, XP 010805976; ISBN: 978-0/7803-8337-1.

Kobayashi, H. et al. "Proposal of OFDM Channel Estimation using Discrete Cosine Transform" 15th IEEE International Symposium on Personal Indoor and Mobile Radio Communications, pp. 1797-1801, 2004, ISBN: 0780385233.

Yen-Hui, Y. et al. "DCT-Based Channel Estimation for OFDM Systems" IEEE Communications Society, 2004, pp. 2442-2446, 0/7803-8533-0104.

Kai Yu "Multiple-Input Multiple-Output Radio Propagation Channels: Characteristics and Models" Thesis, Signal Processing Department of Signals, Sensors and Systems, Royal Institute of Technology, Stockholm, SE, 2005, pp. 1-140, TRITA-S3-SB-0505, ISSN: 1103-8039.

* cited by examiner

METHOD AND A CHANNEL ESTIMATING ARRANGEMENT FOR PERFORMING CHANNEL ESTIMATION

CROSS-REFERENCE TO RELATED APPLICATIONS

This application claims priority under 35 U.S.C. §119 to European Patent Application EP 10160594.7, filed Apr. 21, 2010, which is hereby incorporated herein by reference in its entirety.

TECHNICAL FIELD

The invention relates to a method and channel estimating arrangement in a receiving communication node. In particular, the invention relates to channel estimation in a radio communications network.

BACKGROUND

Long Term Evolution (LTE) is the name given to a project within the Third Generation Partnership Project (3GPP) aiming to improve the Universal Mobile Telecommunications System (UMTS) mobile phone standard to cope with future requirements.

In Downlink (DL) transmissions, the LTE communications air interface, Evolved UMTS Terrestrial Radio Access (E-UTRA), uses Orthogonal frequency-division multiplexing (OFDM) with 15 kHz subcarrier spacing and up to 2048 subcarriers. The same carrier spacing and max bandwidth is applicable also in Uplink (UL) transmissions, although the communications air interface is based upon single-carrier frequency-division multiple access (SC-FDMA).

A user equipment in a radio communications network signals data to a radio base station for accessing the radio communications network or communicating within the radio communications network. The radio base station receives the data and processes the data according to a receiver chain, for example, an LTE UL Layer 1 (L1) receiver chain comprising the following steps:
1. Fast Fourier Transform (FFT) to extract users per antenna
2. Channel estimation per antenna and user
3. Combined maximal ratio combining (MRC) diversity technique, combining of antennas, and Equalization using the channel estimate from the channel estimation
4. Inverse Fast Fourier transform (IFFT)
5. Decoding In LTE the channel estimation is based on reference symbols (RS) in a channel, these RS are sometimes called pilots. The channel can hence be estimated as a matched filter, that is, correlating the known structure of reference symbols in an ideal signal with the received reference symbols in real signal to detect the presence of the known structure in the real signal.

The equalization is based upon the channel estimation and the purpose of the equalization is to compensate for a frequency selective channel that might appear due to multi-path fading. Embodiments herein are related to the LTE UL receiver chain and in particular to the channel estimation procedure, but may also relate to similar systems performing channel estimation using discrete cosine transformation. The better the channel estimation becomes the better will the equalization work and the less errors will be introduced in the data flow.

Discrete Cosine Transform (DCT) can be used to improve the frequency channel response on RS. The DCT process transforms the estimated channel response, also referred to as estimated channel, to the DCT domain and truncates the estimated channel response. Since the channel response in DCT domain ends up in the first samples, also known as taps, whereas the noise is spread out, a truncation will significantly improve the signal to noise ratio.

The main benefit of using DCT is that it is efficient and simple to implement. A problem with DCT is however that the truncation in DCT domain causes spectral leakage in frequency domain. Applying truncation in DCT domain is similar to a rectangular window in time domain, which corresponds to convolution with a sinc function in frequency domain. This undesirable effect of truncation would cause more distortion to the channels with larger delay spread since large delay spread corresponds to a long tail in DCT domain and the channel's energy is sacrificed in the long tail by applying truncation. FIG. 1 shows an example of the difference between a real channel and an estimated channel by using DCT 11 with truncation and no truncation 10. The truncation is needed to improve the signal to noise ratio in the estimated channel without truncation 10. The channel in DCT domain is defined in the y-axis and the taps in the DCT domain are defined along the x-axis. The real channel 12 has four non-trivial taps, taps five and up are very close to zero, but the truncation only keep the first tap and set the other taps to zero, resulting in that channel data is removed by the truncation.

SUMMARY

There is an object with the present solution is to provide a mechanism that enables a more accurate channel estimation in a receiving communication node.

In some embodiments herein the object is achieved by providing a method in a receiving communication node. The method is for performing channel estimation on a signal received over a channel from a transmitting communication node. The receiving and transmitting communication nodes are comprised in a radio communications network. The receiving communication node receives the signal from the transmitting communication node and applies a matched filtering to the signal, resulting in an estimated channel. The receiving communication node transforms the estimated channel from a frequency domain to a discrete cosine transform domain in a discrete cosine transformation process. The receiving communication node then truncates the transformed estimated channel by applying a sloped window truncation function of an adaptive length onto the transformed estimated channel. The adaptive length in the discrete cosine transform domain is calculated based on channel state information. Furthermore, the receiving communication node transforms the truncated transformed estimated channel from the discrete cosine transform domain to the frequency domain in an inverse discrete cosine transformation process resulting in a channel estimate of the channel estimation.

In order to perform the method a channel estimating arrangement is provided in the receiving communication node. The channel estimating arrangement is for performing channel estimation on a signal received from a transmitting communication node. The receiving communication node and the transmitting communication node are arranged to be comprised in a radio communications network. The channel estimating arrangement comprises a receiving circuit configured to receive the signal from the transmitting communication node. The channel estimating arrangement further comprises a filtering circuit coupled to the receiving circuit and configured to apply a matched filtering on the received signal, resulting in an estimated channel. Furthermore, the channel estimating arrangement comprises a transforming circuit coupled to the filtering circuit and configured to transform the estimated channel from a frequency domain to a discrete cosine transform domain in a discrete cosine transformation process. The channel estimating arrangement further comprises a truncating circuit coupled to the transforming circuit and configured to apply a sloped window truncation function of an adaptive length onto the transformed estimated channel. The adaptive length in the discrete cosine transform domain is calculated based on channel state information of the channel in a calculating circuit coupled to the truncating circuit. The channel estimating arrangement further comprises an inverse transforming circuit coupled to the truncating circuit and configured to transform the truncated transformed estimated channel from the discrete cosine transform domain to the frequency domain in an inverse discrete cosine transformation process resulting in a channel estimate of the channel estimation.

Since the sloped window function is used in a truncation function the change of the channel response, also known as estimated channel, in DCT domain is smoothed and a more accurate channel estimation is achieved. This window function is adaptive to the Channel State Information (CSI), i.e., the length of the window function in the DCT domain is dependent on, for example, the Root Mean Square (RMS) delay spread and the average Signal to Noise Ratio (SNR).

In some embodiments, the effect of truncation to time dispersive channels, i.e., how much distortion the truncation would cause to channels with different delay spread, is considered. The channel dispersion in time domain is characterized by RMS delay spread and it determines how fast the channel response would drop in DCT domain as the number of taps increases with the delay spread. Therefore, a large window length, in some embodiments, will be chosen when delay spread is high, and vice versa. On the other hand, the SNR indicates how accurate the estimation of the channel response is in DCT domain, in other words, more taps may be kept by the window function if SNR is high.

BRIEF DESCRIPTION OF THE DRAWINGS

Embodiments will now be described in more detail in relation to the enclosed drawings, in which.

DETAILED DESCRIPTION

Figure 1:
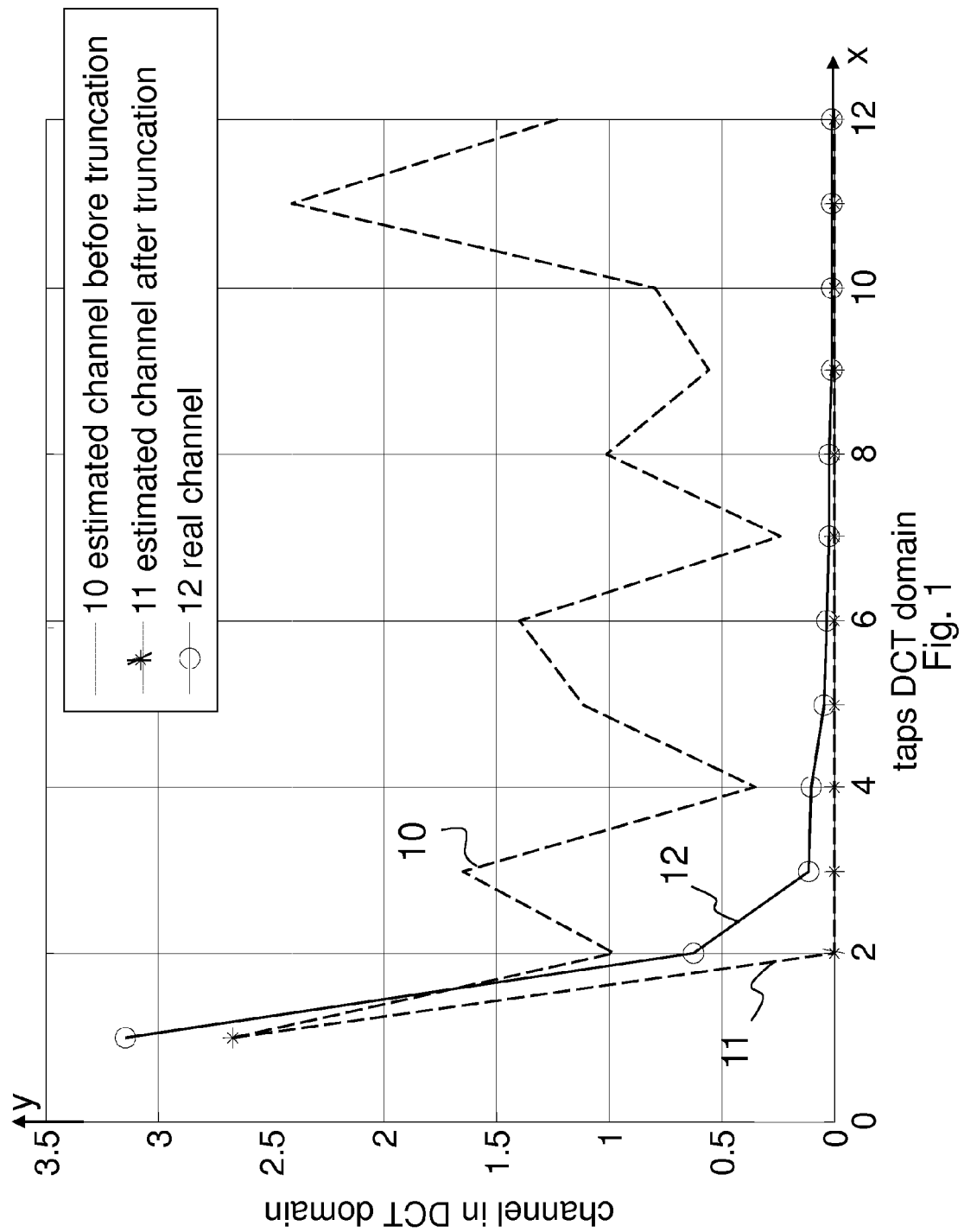
FIG. 1 shows a schematic graph in the DCT domain comparing a real channel to an estimation of the channel.
Figure 2:
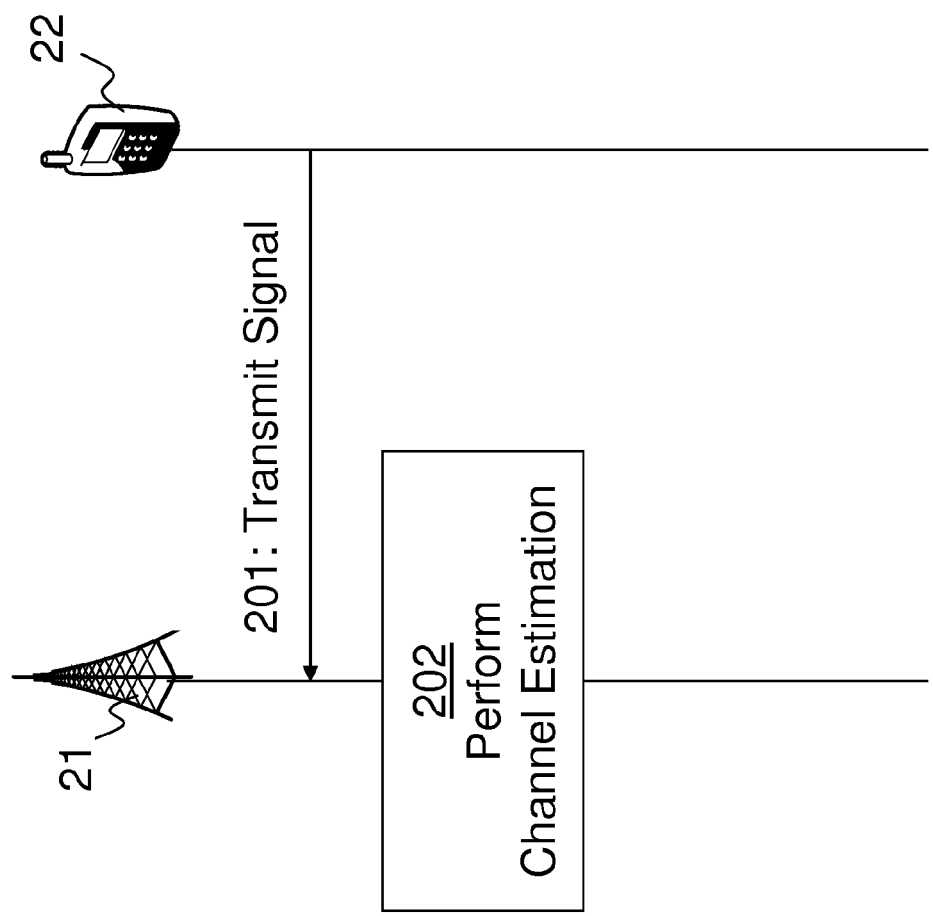
FIG. 2 shows a schematic combined flowchart and signalling scheme in a radio communications network.

FIG. 2 is a combined flowchart and signalling scheme in a radio communications network. In the illustrated example the radio communications network comprises a controlling node, generically referred to as a "radio base station", RBS 21, controlling cells in the radio communications network. The radio communications network is exemplified as a Long Term Evolution (LTE) network but may be a similar radio communications network using DCT during channel estimation. An RBS may be denoted as an evolved NodeB.

Each cell may comprise a number of user equipments, with the generic name "UE". In the illustrated example, a user equipment 22 is present in the cell and communicates with the radio base station 21 over a radio channel. In this example the radio base station 21 is a receiving communication node performing channel estimation of a signal comprising references symbols, which signal is transmitted over a channel from a transmitting communication node, in this case exemplified as the user equipment 22. However, the receiving communication node may also be represented by the user equipment 22 and the transmitting communication node may also be represented by the radio base station 21.

Step 201

The user equipment 22 transmits the signal to the radio base station 21 over the channel.

Step 202

The radio base station 21 performs a channel estimation of the received signal in order to take the radio propagation conditions into account when recovering information in the signal. The channel estimation is performed according the present solution wherein a sloped window function is applied so that change of the channel response in DCT domain is smoothed and a more accurate estimation is achievable. This sloped window function is adaptive to the Channel State Information (CSI), e.g. the length of the sloped window function is dependent on the Root Mean Square (RMS) delay spread and the average Signal to Noise Ratio (SNR). Thereby, the transmitted information is more accurately recovered than when using prior art truncation methods.

The adaptive window technique is in particular applicable in the cases of small number of Resource Blocks (RB), for example any number that is less than six RBs, and also for channels with high delay spread. In the case of 1 RB, there are 12 taps in DCT domain, and the sloped part is a non-trivial part of the channel response in DCT domain. However, there are more taps with more number of RBs and thereby the channel's energy in the sloped part is trivial and not affected as much by the truncation function.

The window function in this solution implies a sloped function. However, to clarify this, the function is called a sloped window truncation function.

Before describing the sloped window truncation function in more detail with reference to FIG. 3, the original DCT channel estimation method will be explained. Let $\hat{H}_m$ denote the estimated channel, also known as estimated channel response, in frequency domain after matched filter. The matched filtering is performed on the reference symbols in a signal received over the channel. The $\hat{H}_m$, i.e. the complex-valued estimated channel including both amplitude and phase, is the output of the matched filtering. If we let the input to the matched filter be defined as Y, then Y can be modelled as $Y=\hat{H}_m*S+W$, where S is the reference symbols, which is known by the receiver and W is noise. So the estimated channel $\hat{H}_m=(Y-W)/S$.

The estimated channel $\hat{H}_m$ is transformed in a DCT process from the frequency domain to a DCT domain, resulting in a transformed estimated channel in the DCT domain, $\hat{H}_{dct,m}$. Furthermore, a truncation position, $L_{opt}$, is calculated based on certain algorithms e.g., Akaike coefficient method or F-test explained in, for example, T. Söderström and P. Stoica, "System Identification", Prentice Hall, Upper Saddle River, N.J. 1989. The $L_{opt}$ is defined as number of taps in the DCT domain and truncation is done by keeping a $L_{opt}$ tap or taps of the $\hat{H}_{dct,m}$ and set the rest to zero. Finally, an Inverse DCT process is used to transform the truncated channel estimate back to the frequency domain.

Figure 3:
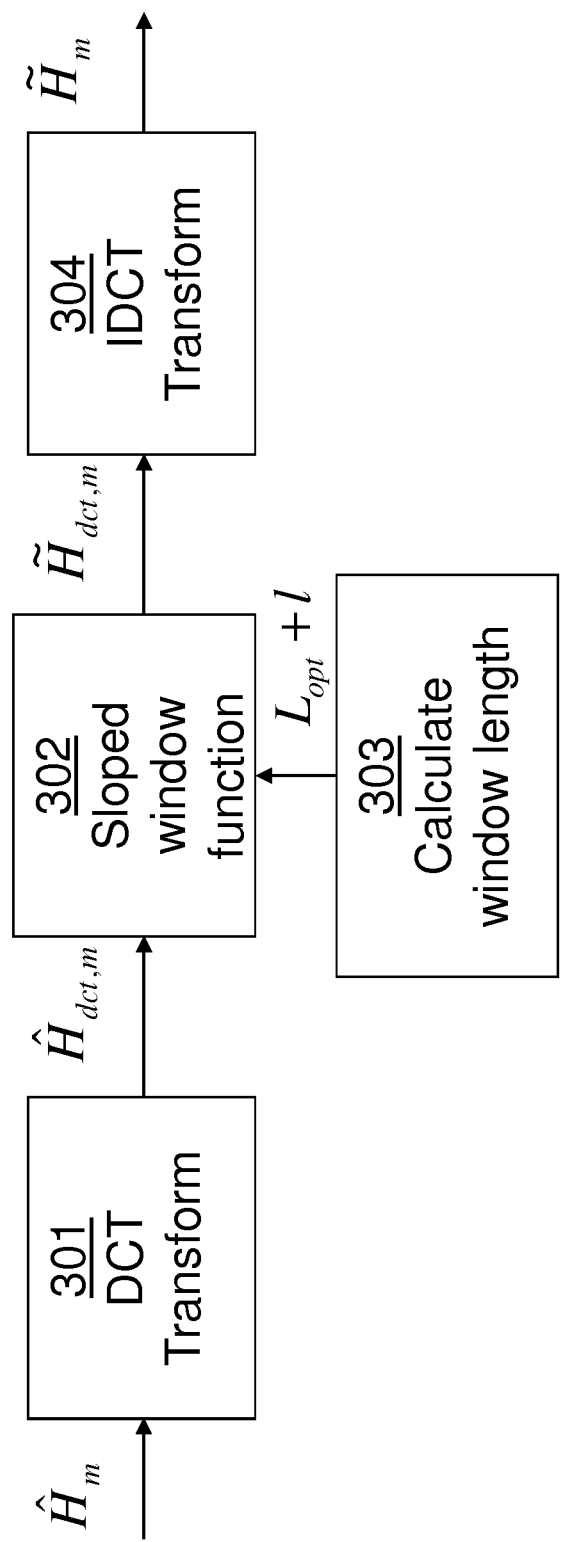
FIG. 3 shows a schematic block diagram of a DCT transformation process with a sloped window truncation function.

FIG. 3 shows a schematic overview of channel estimation using a sloped window truncation technique according to the present solution, wherein the sloped window function is applied instead of the previously used square shaped truncation. As stated above the window function is referred to as the sloped window truncation function and channel response is referred to as estimated channel.

Step 301

The radio base station 21 performs a Discrete Cosine Transform (DCT) on an estimated channel $\hat{H}_m$ in frequency domain received from a matched filter process of a signal received over a radio channel. The Discrete Cosine Transformation of the estimated channel $\hat{H}_m$ results in a transformed estimated channel $\hat{H}_{dct,m}$ in the DCT domain.

Step 302

The radio base station 21 performs the sloped window truncation function on the transformed estimated channel $\hat{H}_{dct,m}$, resulting in an truncated transformed estimated channel $\tilde{H}_{dct,m}$. The sloped window truncation function comprises an adaptive length in the discrete cosine transform domain thereby disclosing a flexible truncation function varying with varying channel state information.

Step 303

The radio base station 21 selects or calculates the adaptive length l based on channel state information of the channel carrying the signal. The channel state information may be detected by measuring channel parameters, such as RS, of a signal received from the user equipment 22 over the channel or indicated from the user equipment 22.

It should be noted that step 303 may be performed before step 302.

The adaptive length l and, in case Lopt from an Akaike based function is also used, the Lopt from the Akaike based function are input to the sloped window truncation function.

The output $\tilde{H}_{dct,m}$ from the sloped truncation function using the adaptive length l, referred to as truncated transformed estimated channel or truncated DCT transformed channel estimate, with the window of a length m may be defined as:

$$\tilde{H}_{dct,m}(m) = \begin{cases} \hat{H}_{dct,m}(m)w(m) & 1 \leq m \leq L_{opt} + l \\ 0 & L_{opt} + l + 1 \leq m \leq N_{sc} \end{cases}$$

where

W is exemplified as the right half of a window function that starts from a peak value, which is normalized to 1. Hamming window may be selected being the most suitable window determined from simulation, but any window that is slope shaped may be used. $N_{SC}$ is the total number of subcarriers, or the total number of samples in DCT domain $L_{opt}+l$ is the length of the half window and the total window length is $2L_{opt}+2l-1$, where '−1' is added because the peak value in the middle should be counted as the start point of the sloped window truncation function.

$L_{opt}$ is an instantaneous parameter that depends on instantaneous channel quality from an Akaike based function or a F-step function.

l is the adaptive length as a long term parameter that relates to the channel state information, such as the average SNR and RMS delay spread.

The relationship between l and channel state information, such as delay spread and SNR, can be written, for example as:

$$l = \alpha \cdot SNR + \beta \cdot \tau_{rms} + \epsilon \cdot SNR \cdot \tau_{rms}$$

or as other functions based on SNR and $\tau_{rms}$.

$\tau_{rms}$ is the RMS delay spread and is supposed to be averaged in time over a time interval from hundreds of ms to a few seconds. For example, a recursive filter could be employed for SNR estimation to be used when determining RMS delay spread or the like.

The parameters $\alpha$, $\beta$, and $\epsilon$ may be found using a least square method.

Thus, step 303 generates an adaptive length to be used in step 302.

Step 304

The radio base station 21 performs an Inverse Discrete Cosine Transformation (IDCT) on the truncated transformed estimated channel $\tilde{H}_{dct,m}$ from the discrete cosine transform domain to the frequency domain, resulting in a channel estimate $\tilde{H}_m$, that is, a resulting estimated channel.

The resulting channel estimate $\tilde{H}_m$ from the IDCT process may then be used to equalise the channel distortion in an equalizer.

As stated above, the example illustrates the case of uplink (UL) transmission but the channel estimation may also be performed on the downlink (DL) transmission. That is, the receiving communication node performing the channel estimation may alternatively be the user equipment 22.

Figure 4:
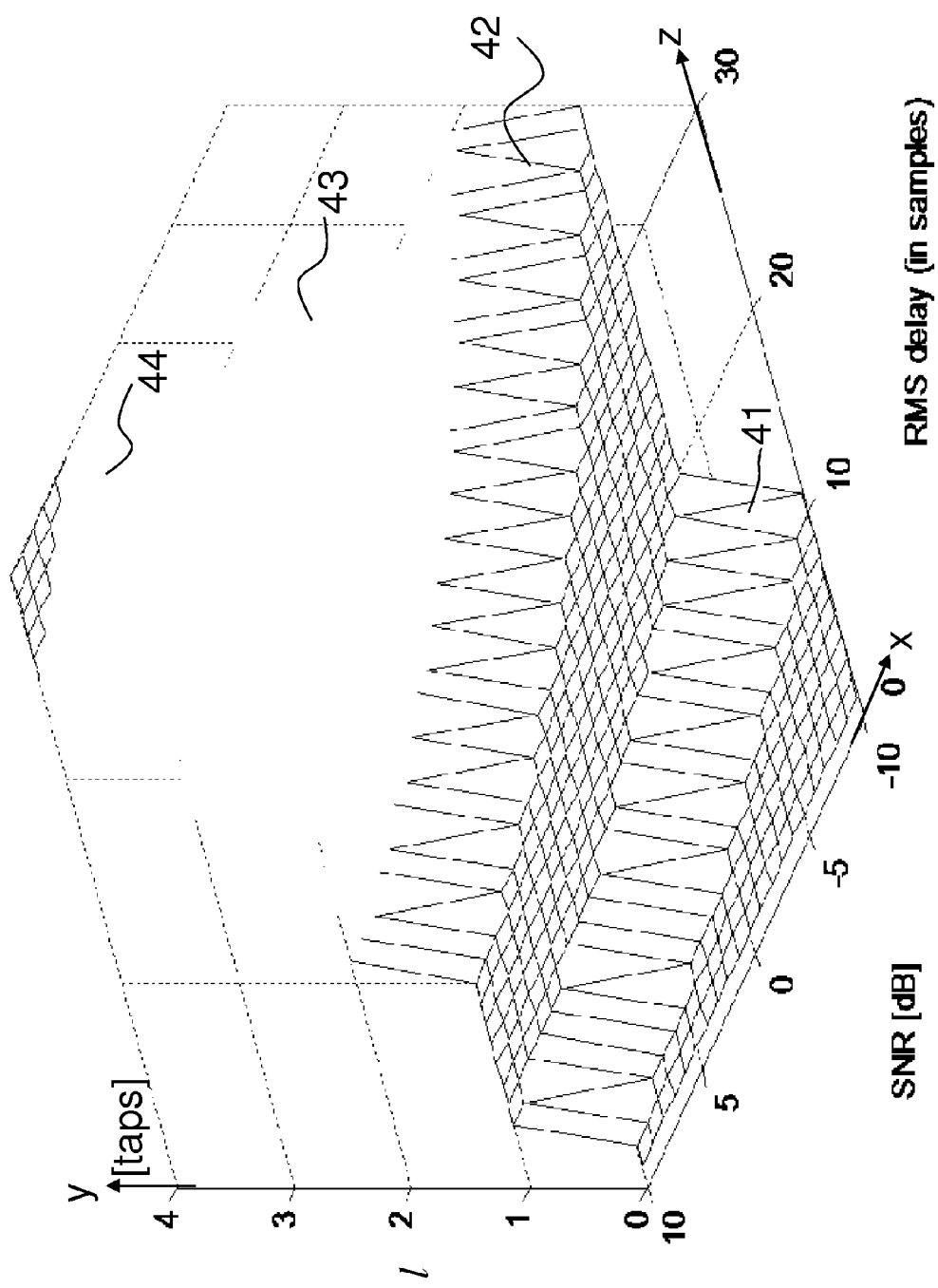
FIG. 4 shows a schematic graph of the adaptive length of the sloped window truncation function as a function of SNR and RMS.

The influence of the RMS delay spread and the SNR on adaptive length l is illustrated in FIG. 4, which shows the adaptive length l of the window as a function of SNR and RMS delay spread. l is measured in number of taps.

The Mean Square Error (MSE) of delay spread is defined as $$\tau_{rms} = \sqrt{\overline{\tau^2} - \overline{\tau}^2}$$

where $$\overline{\tau} = \frac{\sum_n |a_n|^2 \tau_n}{\sum_n |a_n|^2}, \quad \overline{\tau^2} = \frac{\sum_n |a_n|^2 \tau_n^2}{\sum_n |a_n|^2}$$

$\overline{\tau}$ is the first order moment of the delay spread,
$\overline{\tau^2}$ is the second order moment of the delay spread, and
$|a_n|^2$ is the power associated with the delay of the nth tap.

A first curve 41 illustrates SNR and RMS delay spread resulting in an adaptive length l of one tap. A second curve 42 defines SNR and RMS delay spread when the adaptive length l is two taps. A third curve 43 defines SNR and RMS delay spread that gives the adaptive length l of three taps. A fourth curve 44 defines SNR and RMS delay spread that gives the adaptive length l of four taps. The adaptive length l is defined in the y-axis, the SNR is defined along the x-axis, and the RMS delay spread is defined along the z-axis.

As seen from the graph high SNR and low RMS delay spread gives the same l as a low SNR with a higher RMS delay spread. Also, it can be seen from the graph that high RMS delay spread gives higher adaptive lengths and that the SNR also influences the adaptive length but less than the RMS delay spread. For example, the highest RMS delay spread gives adaptive lengths l of two to four taps wherein the highest SNR gives adaptive lengths l of one to four taps. Hence, adaptive length l may be one tap if the SNR is very high and the RMS delay spread is very low but the adaptive length l is two taps even if the SNR is very low and the RMS delay spread is very high.

Figure 5:
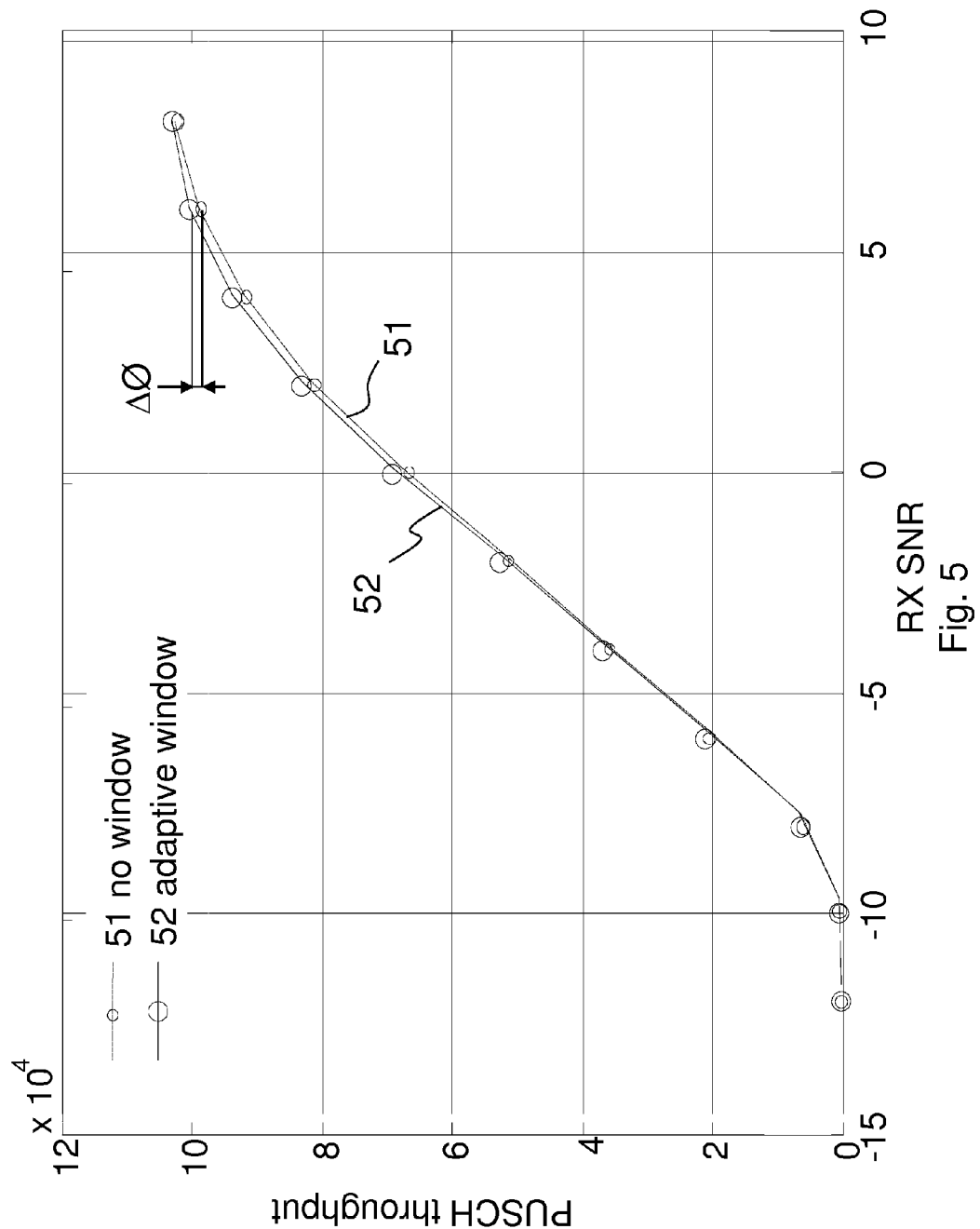
FIG. 5 shows a schematic graph of throughput compared between channel estimation using square shaped truncation function and the sloped window truncation function.

In FIG. 5 shows a schematic graph comparing throughput of a square shaped truncation function with throughput of the sloped window truncation function from a simulation. The truncation influences the throughput since the truncation influences the accuracy of channel estimation, which channel estimation has an impact on a following equalization using the estimated channel. The graph illustrates throughput as a function of Receiver (RX) SNR in Extended Typical Urban (ETU) mode 300 Hz, 1 RB, 2 Receivers (RX), and Quadrature Phase Shift Keying (QPSK) mode. The throughput is defined in the y-axis and the RX SNR is defined along the x-axis.

Graph 51 illustrates the throughput on a Physical Uplink Shared Channel (PUSCH) with a channel estimation using a square shaped truncation function.

Graph 52 illustrates the throughput on a PUSCH with a channel estimation using the sloped window truncation function.

From the graph one can see an improvement of maximally 0.7 dB at high SNRs indicated as ΔØ in the graph.

Herein it is provided an improved channel estimation procedure intended to be used in for example LTE UL with small number of RSs. The method may be an enhancement of the already well known channel estimation method based on DCT and is applicable to all telecommunications systems using DCT for channel estimation.

Simulations have shown that gain can be achieved by using the suggested method. In terms of channel Mean Square Error (MSE), the gain is about 4 dB at medium and high SNRs in ETU channels, which corresponds to 0.7 dB gain in throughput if QPSK modulation is used. As we decrease the delay spread, the gain shrinks. It should be noticed that the algorithm is not sensitive to Doppler frequency.

The method provides an improved network performance in terms of higher throughput. The calculation of the adaptive length l may be performed periodically, when the channel state information changes. The sloped window truncation function is also simple and fully compatible with the original truncation function, which makes it possible to switch between the original square shaped truncation function and the sloped window truncation function.

Figure 6:
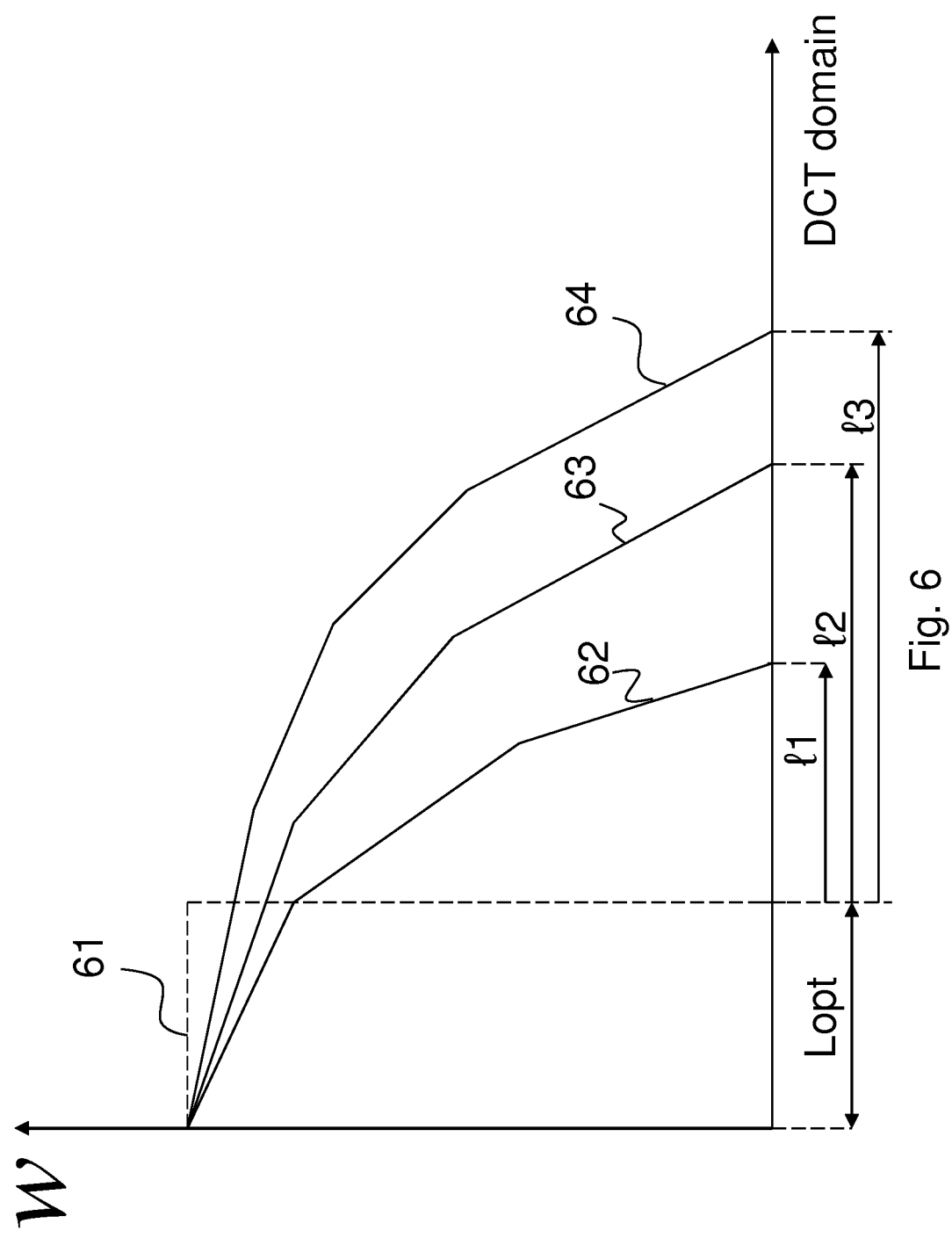
FIG. 6 shows a schematic graph of the window sloped truncation in relation to the adaptive length of the sloped window truncation function.

FIG. 6 is a schematic diagram depicting window functions defined in the DCT domain. The window's amplitude is defined in the y-axis and the total length is defined along the x-axis. The sloped window truncation function is exemplified in different embodiments with different lengths. A square shaped truncation 61 with an optimal length (Lopt) is shown as a dashed line. A first sloped window truncation function 62 of a channel with a first channel state information is exemplified as a sloped function with a first extended length of Lopt+l1. A second sloped window truncation function 63 of a channel with a second channel state information is exemplified as a sloped function with a second extended length of Lopt+l2, being less steep or elevated than the first sloped window truncation function 62. A third sloped window truncation function 64 with a third channel state information is exemplified as a sloped function with a third extended length of Lopt+l3, being less steep or elevated than the second sloped window truncation function 63. The length of the sloped window truncation functions, and hence also the inclination of the sloped truncation window function, are based on the channel state information. For example, the first sloped window truncation function 62 is applied to an estimated channel with a first delay spread that is shorter than the delay spread of the estimated channel of the second sloped window truncation function 63. Similarly, the third sloped window truncation function 64 is applied to a estimated channel with a third delay spread that is longer than the delay spread of the estimated channel of the second sloped window truncation function 63.

Lopt may be calculated using an Akaike coefficient, where the Akaike coefficient, and thereby Lopt, is dependent on instantaneous SNR. Hence, the channel estimation based on Akaike coefficient only considers the instantaneous SNR. However, the channel estimation should not only depend on instantaneous SNR, but may also depend on, for example, the delay spread as well as the long term average SNR. This makes it possible to optimize channel estimation for all scenarios. By implementing the sloped window truncation function of adaptive length, the channel estimation may be optimized to different channel state information over time resulting in a more flexible and accurate channel estimation.

In some embodiments, the sloped window function may be applied when calculating a modified Lopt of an Akaike coefficient. Hence, in this manner the modified Lopt in itself will be adaptive to different lengths.

Figure 7:
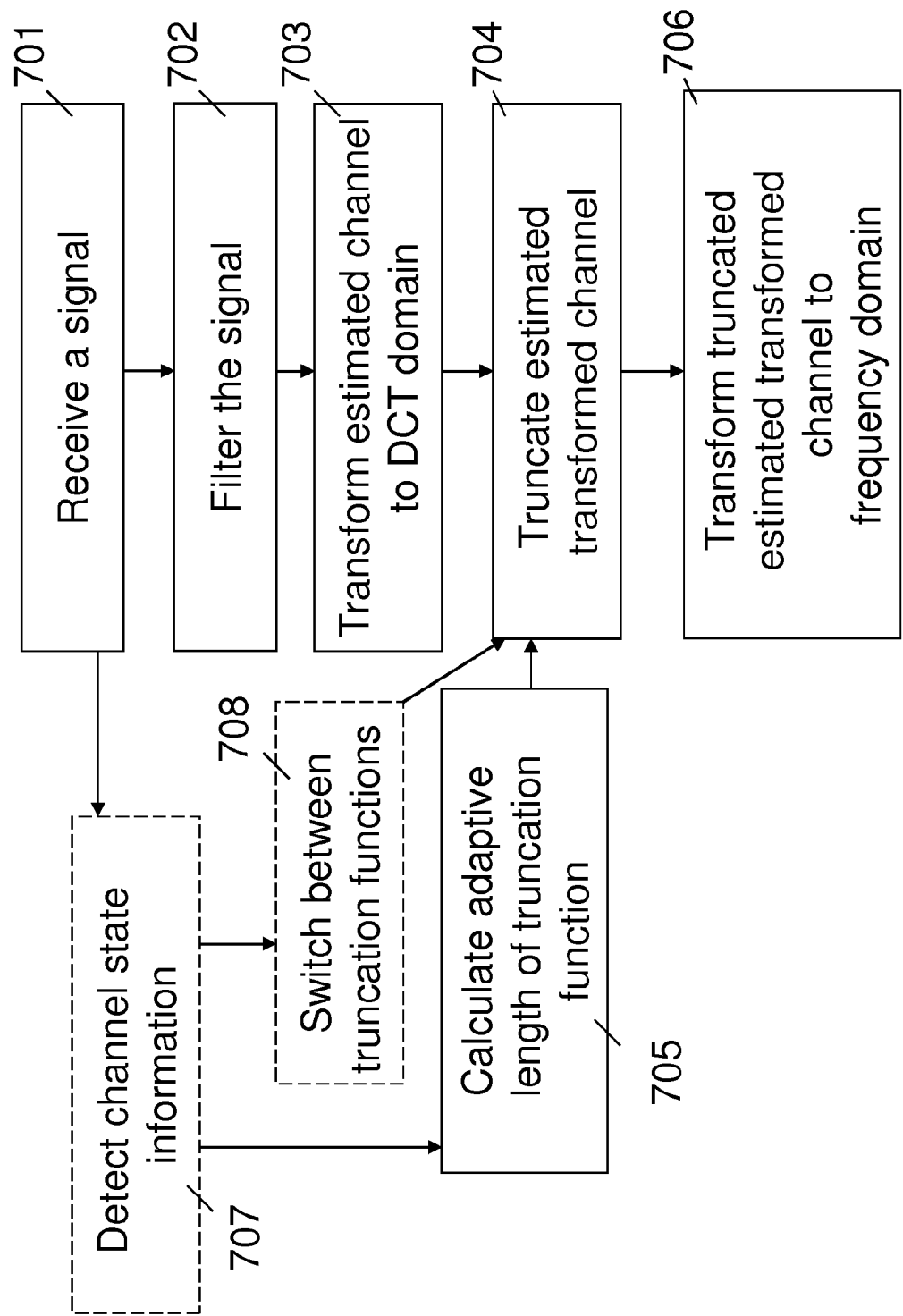
FIG. 7 shows a schematic flow chart of a method in a receiving communication node.

The method steps in the receiving communication node 21,22, for example a radio base station or a user equipment, for performing channel estimation of a radio channel based on a signal transmitted over the radio channel and received from a transmitting communication node 22,21 according to some general embodiments will now be described with reference to a flowchart depicted in FIG. 7. The steps do not have to be taken in the order stated below, but may be taken in any suitable order. The receiving and the transmitting communication nodes 21,22 are comprised in a radio communications network Step 701. The receiving communication node (21,22) receives the signal from the transmitting communication node (22,21). The signal may be received over an air interface uplink or downlink using Orthogonal frequency-division multiplexing (OFDM) based technologies.

Step 702. The receiving communication node (21,22) filters the received signal by applying a matched filter to the received signal in a matched filter process resulting in an estimated channel.

Step 703. The receiving communication node (21,22) transforms the estimated channel from a frequency domain to a discrete cosine transform domain in a discrete cosine transformation process.

Step 704. The receiving communication node (21,22) truncates the transformed estimated channel by applying a sloped window truncation function of an adaptive length onto the transformed estimated channel.

The sloped window truncation function with the adaptive length may in some embodiments be defined by $$\tilde{H}_{dct,m}(m) = \begin{cases} \hat{H}_{dct,m}(m)w(m) & 1 \leq m \leq L_{opt} + l \\ 0 & L_{opt} + l + 1 \leq m \leq N_{sc} \end{cases}$$

where
  $\hat{H}_{dct,m}$ denotes the transformed estimated channel obtained from DCT transformation of the estimated channel,
  $\tilde{H}_{dct,m}$ denotes the truncated transformed estimated channel, and
  w is the window, or a half of the window, of the sloped window truncation function that starts from a peak value, which is normalized to 1,
  $L_{opt}+l$ is the length of the window or the half window, l is the adaptive length,
$L_{opt}$ is a truncation position that depends on instantaneous channel quality, and
$N_{SC}$ is a total number of subcarriers, or resource block size in the frequency domain, expressed as a number of subcarriers indicating total number of samples or taps in DCT domain.

In some embodiments, the sloped window truncation function is included in a window length selection function, e.g., Akaike method and/or F-test. This can be regarded as a generalized criterion. This is similar to a sloped window function, but the length of the window $L_{opt}+1$ is computed as one variable.

Step 705. The receiving communication node (21,22) calculates the adaptive length in the discrete cosine transform domain based on channel state information. In some embodiments, the channel state information comprises a signal to noise ratio of the radio channel and a delay spread of the radio channel.

In some embodiments, the adaptive length is defined by a parameter 'l', wherein l is a function of Signal to Noise Ratio and Root Mean Square delay spread $\tau_{rms}$. That is, $$l=f(SNR,\tau_{rms})$$

where
SNR is Signal to Noise Ratio; and
$\tau_{rms}$ is Root Mean Square delay spread.

Furthermore, the Root Mean Square delay spread, $\tau_{rms}$, may be defined as $$\tau_{rms}=\sqrt{\overline{\tau^2}-\overline{\tau}^2}$$

where $\overline{\tau}$ and $\overline{\tau^2}$ are defined as $$\overline{\tau}=\frac{\sum_n |a_n|^2 \tau_n}{\sum_n |a_n|^2}, \overline{\tau^2}=\frac{\sum_n |a_n|^2 \tau_n^2}{\sum_n |a_n|^2}$$

where
$\overline{\tau}$ is a first order moment of the delay spread,
$\overline{\tau^2}$ is a second order moment of the delay spread, and
$|a_n|^2$ comprises a power associated with a nth tap delay.

Step 706. The receiving communication node 21,22 transforms the truncated transformed estimated channel from the discrete cosine transform domain to the frequency domain in an inverse discrete cosine transformation process resulting in a channel estimate of the channel estimation.

Step 707. This is an optional step as indicated by the dashed line. The receiving communication node 21,22 detects that channel state information of the channel changes, for example by analysing a newly received signal over the radio channel or as indicated from the transmitting communication node 22,21. In the case that a change is detected, the receiving communication node 21,22 calculates, in step 705, a different adaptive length of the sloped window truncation function based on the changed channel state information.

Step 708. This is an optional step as indicated by the dashed line. The receiving communication node 21,22 may in some embodiments perform an conventional square shaped truncation function based on a generalized Akaike information criterion instead of applying the sloped window truncation function. The receiving communication node 21,22 may then switch between applying the sloped window truncation function and the conventional square shaped truncation function onto the transformed signal based on a detected channel state information compared to a preset channel state information threshold.

In some embodiments, the receiving communication node comprises a radio base station and the transmitting communication node comprises a user equipment served by the radio base station.

Figure 8:
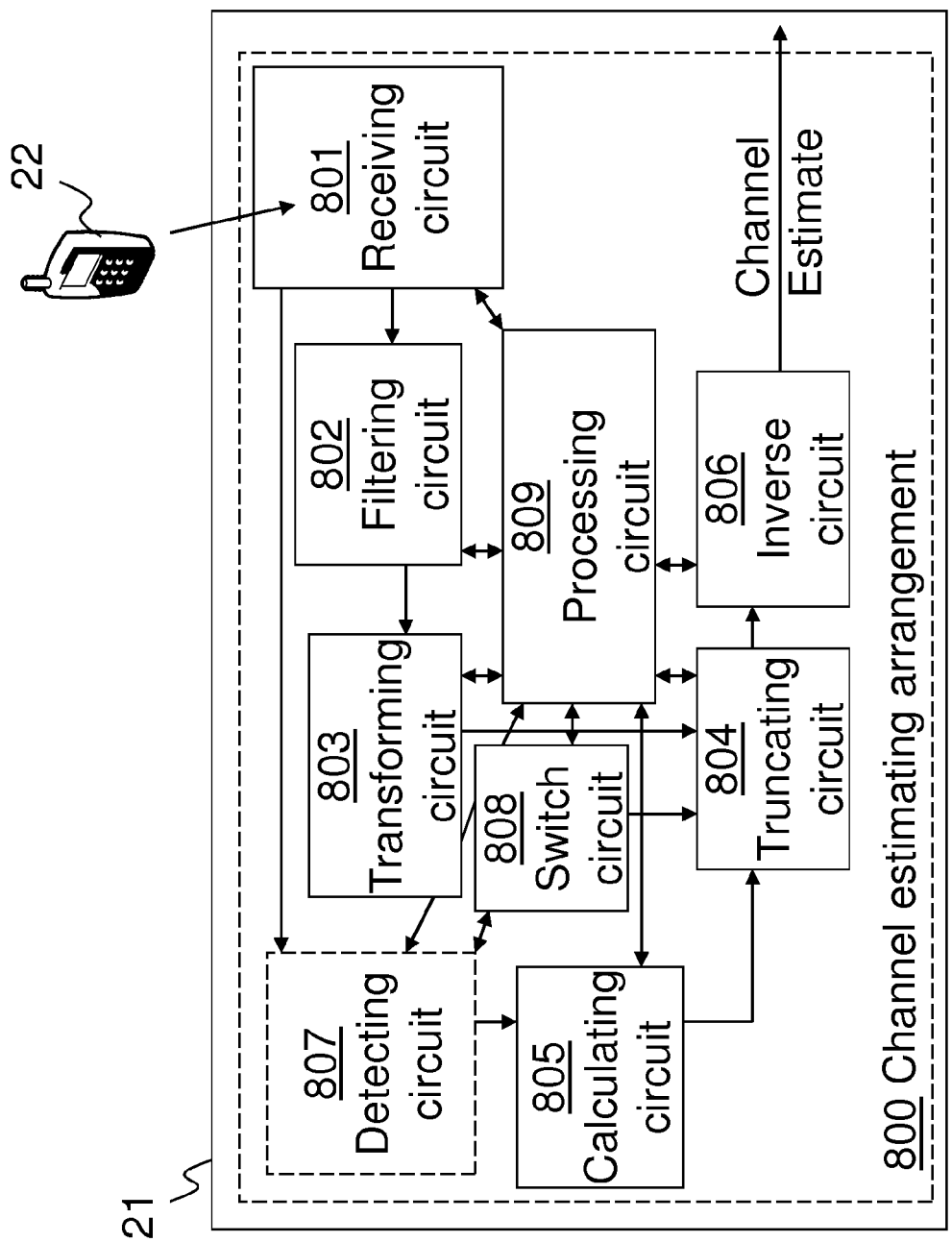
FIG. 8 shows a schematic block diagram of a channel estimating arrangement in a receiving communication node.

In order to perform the method steps above the receiving communication node 21,22 comprises a channel estimating arrangement 800. FIG. 8 is a schematic block diagram depicting the channel estimating arrangement 800 for performing channel estimation on a signal received from a transmitting communication node 22,21 over a radio channel.

The receiving communications node 21,22 and transmitting communication node 22,21 are arranged to be comprised in the radio communications network.

The channel estimating arrangement 800 comprises a receiving circuit 801 configured to receive the signal from the transmitting communication node 22,21, and a matched filtering circuit 802, denoted as filtering circuit in the figure, coupled to the receiving circuit 801 and configured to apply a matched filtering process to the received signal resulting in an estimated channel.

Furthermore, the channel estimating arrangement 800 comprises a transforming circuit 803 coupled to the matched filtering circuit 802 and configured to transform the estimated channel from a frequency domain to a discrete cosine transform domain in a discrete cosine transformation process. The channel estimating arrangement 800 further comprises a truncating circuit 804 coupled to the transforming circuit 803 and configured to apply a sloped window truncation function of an adaptive length onto the transformed estimated channel. The adaptive length in the discrete cosine transform domain is calculated in a calculating circuit 805 being configured to calculate the adaptive length based on channel state information of the radio channel and coupled to the truncating circuit 804.

The channel estimating arrangement 800 also comprises an inverse transforming circuit 806, denoted as inverse circuit in the figure, coupled to the truncating circuit 804 and configured to transform the truncated transformed estimated channel from the discrete cosine transform domain to the frequency domain in an inverse discrete cosine transformation process resulting in a channel estimate of the channel estimation.

The receiving circuit may be configured to receive the signal over an air interface uplink or downlink using Orthogonal frequency-division multiplexing (OFDM) based technologies.

The channel estimating arrangement 800 may in some embodiments further comprise a detecting circuit 807 coupled to the receiving circuit 801 and configured to detect when the channel state information of the channel changes. When the detecting circuit 807 detects this change of channel state information the calculating circuit 805 may recalculate a different adaptive length of the sloped window truncation function based on the changed channel state information.

In some embodiments the sloped window truncation function is included in a window length selection function in the calculating circuit 805. Thus, the selection of the length of the Akaike method or F-test may take into account the adaptive length of the sloped truncation function. This is similar to a sloped window function, but the window length Lopt+l is computed as one variable.

In some embodiments, the channel estimating arrangement 800 may also be capable of performing a conventional square shaped truncation function based on a generalized Akaike information criterion instead of applying the sloped window truncation function. The channel estimating arrangement may then further comprise a switch circuit 808 coupled to the detecting circuit 807 and configured to switch between applying the sloped window truncation function and the conventional square shaped truncation function onto the transformed signal based on a detected channel state information compared to a preset channel state information threshold.

The present mechanism for performing channel estimation on a signal received from a transmitting communication node may be implemented through one or more processors, such as a processing circuit 809 in the receiving communication node 21,22 depicted in FIG. 8, together with computer program code for performing the functions of the present solution. The program code mentioned above may also be provided as a computer program product, for instance in the form of a data carrier carrying computer program code for performing the present solution when being loaded into the receiving communication node 21,22. One such carrier may be in the form of a CD ROM disc. It is however obtainable with other data carriers such as a memory stick. The computer program code may furthermore be provided as pure program code on a server and downloaded to the receiving communication node.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a receiving communication node for performing channel estimation on a signal received over a radio channel from a transmitting communication node, which receiving and transmitting communication nodes are comprised in a radio communications network, the method comprising:
   receiving the signal from the transmitting communication node;
   filtering the signal by applying matched filter to the received signal in a matched filter process resulting in an estimated channel;
   transforming the estimated channel from a frequency domain to a discrete cosine transform domain in a discrete cosine transformation process;
   truncating the transformed estimated channel by applying a sloped window truncation function of an adaptive length onto the transformed estimated channel, wherein the adaptive length in the discrete cosine transform domain is calculated based on channel state information; and
   transforming the truncated transformed estimated channel from the discrete cosine transform domain to the frequency domain in an inverse discrete cosine transformation process resulting in a channel estimate of the channel estimation.

2. A method according to claim 1, wherein the channel state information comprises a signal to noise ratio of the radio channel and a delay spread of the radio channel.

3. A method according to claim 2, wherein the adaptive length is defined by a parameter 'l', wherein l is a function of Signal to Noise Ratio; and Root Mean Square delay spread, referred to as $\tau_{rms}$.

4. A method according to claim 3, wherein the Root Mean Square delay spread, $\tau_{rms}$, is defined as $$\tau_{rms} = \sqrt{\overline{\tau^2} - \overline{\tau}^2}$$

where $$\overline{\tau} = \frac{\sum_n |a_n|^2 \tau_n}{\sum_n |a_n|^2}, \overline{\tau^2} = \frac{\sum_n |a_n|^2 \tau_n^2}{\sum_n |a_n|^2}$$

where
$\overline{\tau}$ is a first order moment of the delay spread,
$\overline{\tau^2}$ is a second order moment of the delay spread, and
$|a_n|^2$ is the power associated with the delay of the nth tap.

5. A method according to claim 1, wherein the sloped window truncation function with the adaptive length is defined by $$\tilde{H}_{dct,m}(m) = \begin{cases} \hat{H}_{dct,m}(m)w(m) & 1 \le m \le L_{opt} + l \\ 0 & L_{opt} + l + 1 \le m \le N_{sc} \end{cases}$$

where
$\hat{H}_{dct,m}$ denotes the transformed estimated channel obtained from DCT transforming the estimated channel,
$\tilde{H}_{dct,m}$ denotes the truncated transformed estimated channel, and
w is the window of the sloped window truncation function that starts from a peak value, which is normalized to 1,
$L_{opt}$+l is the length of the window,
l is the adaptive length;
$L_{opt}$ is a truncation position that depends on instantaneous channel quality, and
$N_{sc}$ is a total number of subcarriers.

6. A method according to claim 1, further comprising:
   detecting that channel state information of the radio channel changes, and, in that case,
   calculating a different adaptive length of the sloped window truncation function based on the changed channel state information.

7. A method according to claim 1, wherein the sloped window truncation function is included in a window length selection function.

8. A method according to claim 1, wherein the receiving communication node comprises a radio base station and the transmitting communication node comprises a user equipment served by the radio base station.

9. A method according to claim 1, wherein the receiving communication node also is capable of performing a conventional square shaped truncation function based on a generalized Akaike information criterion instead of applying the sloped window truncation function and the method further comprises:
   switching between applying the sloped window truncation function and the conventional square shaped truncation function onto the transformed signal based on a detected channel state information compared to a preset channel state information threshold.

10. A method according to claim 1, wherein the signal is received over an air interface uplink or downlink using Orthogonal frequency-division multiplexing based technologies.

11. A channel estimating arrangement in a receiving communication node for performing channel estimation on a signal received from a transmitting communication node over a radio channel, which receiving communication node and transmitting communication node are arranged to be comprised in a radio communications network, the channel estimating arrangement comprising:
- a receiving circuit configured to receive the signal from the transmitting communication node;
- a matched filtering circuit coupled to the receiving circuit and configured to apply a matched filtering process to the received signal resulting in an estimated channel;
- a transforming circuit coupled to the matched filtering circuit and configured to transform the estimated channel from a frequency domain to a discrete cosine transform domain in a discrete cosine transformation process;
- a truncating circuit coupled to the transforming circuit and configured to apply a sloped window truncation function of an adaptive length onto the transformed estimated channel, wherein the adaptive length in the discrete cosine transform domain is configured to be calculated, based on channel state information of the radio channel, in a calculating circuit coupled to the truncating circuit; and
- an inverse transforming circuit coupled to the truncating circuit and configured to transform the truncated transformed estimated channel from the discrete cosine transform domain to the frequency domain in an inverse discrete cosine transformation process resulting in a channel estimate of the channel estimation.

* * * * *

UNITED STATES PATENT AND TRADEMARK OFFICE
CERTIFICATE OF CORRECTION

PATENT NO. : 8,711,991 B2  
APPLICATION NO. : 13/084470  
DATED : April 29, 2014  
INVENTOR(S) : Huang et al.

Page 1 of 1

It is certified that error appears in the above-identified patent and that said Letters Patent is hereby corrected as shown below:

In the Specification

In Column 8, Line 62, delete " $H_{dct,m}$ " and insert -- $\tilde{H}_{dct,m}$ --, therefor.

Signed and Sealed this  
Thirty-first Day of March, 2015

Michelle K. Lee  
*Director of the United States Patent and Trademark Office*